Jan. 17, 1928.

H. I. FINCH 1,656,702

BEARING LUBRICATING MEANS

Filed Oct. 6, 1924

Inventor.
Herbert I. Finch,
By Rippey & Kingsland
His Attorneys.

Patented Jan. 17, 1928.

1,656,702

UNITED STATES PATENT OFFICE.

HERBERT I. FINCH, OF ST. LOUIS, MISSOURI, ASSIGNOR TO THE EMERSON ELECTRIC MFG. CO., OF ST. LOUIS, MISSOURI, A CORPORATION OF MISSOURI.

BEARING-LUBRICATING MEANS.

Application filed October 6, 1924. Serial No. 741,885.

This invention relates to bearing lubricating means, and is specially designed and adapted for use for lubricating the shafts of electric motors.

An object of the invention is to provide an improved bearing lubricating means for the shaft of an electric motor in which a bearing bushing for the shaft extends across a reservoir containing lubricant, said bearing bushing being provided with longitudinal internal grooves above and below the shaft designed and adapted to receive lubricant delivered thereto by wicking or equivalent means extending across and contacting with the shaft within a transverse opening in the bushing which intersects the channel above the shaft.

Another object of the invention is to provide an improved lubricating means of the character mentioned in which the wicking is looped around the shaft and a portion of the bushing and has its lower ends in lubricant saturated wicking imbedded in the lower portion of the reservoir.

Another object of the invention is to provide an improved bearing lubricant means comprising a bearing extending across a reservoir and having its ends supported by the opposite walls of the reservoir and provided with internal grooves terminating short of the ends of the bearing, both of which are designed and adapted to receive lubricant for the shaft extending through the bushing and one of which has an outlet opening for the lubricant; in combination with means for conducting lubricant to the groove having the inlet opening.

Figure 1:
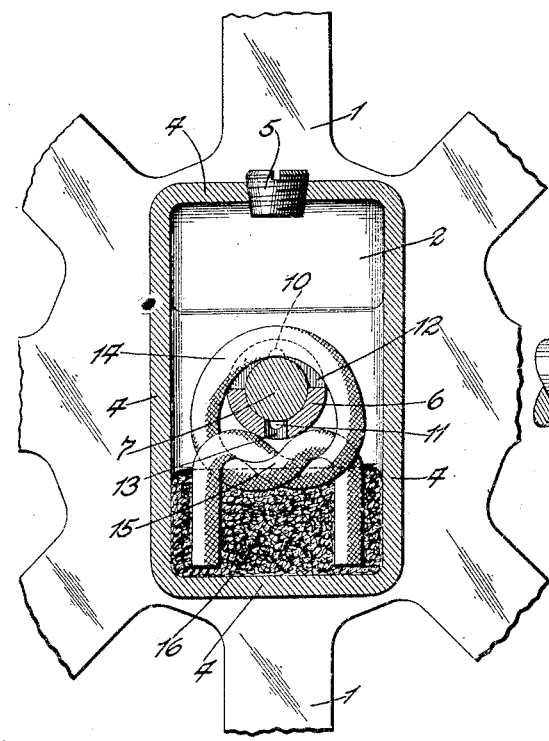

Other objects will appear from the following description, reference being made to the drawing in which Fig. 1 is a vertical sectional view taken transversely of the bearing.

Figure 2:
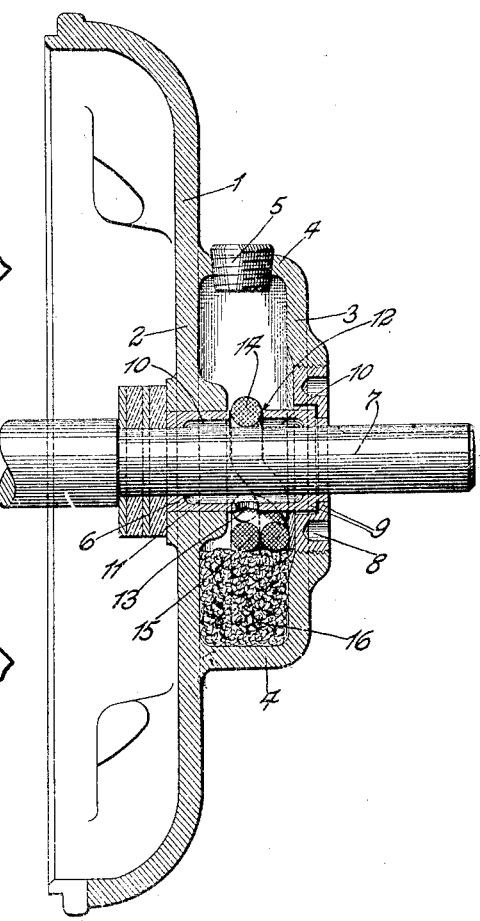

Fig. 2 is a vertical sectional view taken longitudinally of the bearing.

In the present embodiment the invention is shown in connection with the end plate of an electric motor for supporting the armature shaft. The end plate 1 is provided with a reservoir, the inner wall 2 of which is in continuation of the end plate and the outer wall 3 of which is integrally united with and supported from the end plate by top, bottom and side walls 4. The upper wall of the reservoir is provided with an opening having a closure plug 5.

The bearing bushing 6 for the shaft 7 extends entirely across the reservoir and has its inner end supported within an opening in the wall 2 and its outer end supported in an opening in a closure element 8 screwed into a hole in the wall 3 and holding the bushing 6 from outward endwise movement by abutment structure 9.

The bushing 6 is provided with an internal longitudinal groove 10 above the shaft 7 and an internal longitudinal groove 11 below said shaft. The ends of both of said grooves terminate short of the ends of the bushing 6 so that it is impossible for any substantial quantities of lubricant to work through the ends of the bearing. A transverse slot 12 is formed entirely through the upper portion of the bushing and extends approximately half of the circumference thereof, intersecting the groove 10 and terminating above the groove 11. A hole 13 opens from the groove 11 through the lower side of the bushing for discharge of the lubricant therefrom.

A wick 14 passes over the shaft 7 within the slot 12 and may be of sufficient length so that it may have knot or loop connection 15 below the bushing and have its ends imbedded in wicking 16 in the reservoir. This connection of the wick below the bushing prevents it from being drawn out of place.

The wick 14 by capillary action will conduct lubricant from the lower portion of the reservoir and from the wicking 16 directly to the shaft 7 within the slot 12. Portions of the lubricant will pass toward opposite ends of the bushing within the groove 10 and thus continuously supply lubricant to the bearing from the wick 14. As the shaft 7 rotates quantities of the lubricant enter the groove 11 and may be discharged therefrom through the hole 13. It will be noted that the knot or loop connection 15 underlies the bushing drain hole 13. This locating of a portion of the wick 14 below the hole will cause the lubricant discharged from the latter to return to the upper or receiving side of the bushing without passing into the base of the reservoir.

From the foregoing it is apparent that my invention obtains all of its intended objects and purposes and is an efficient bearing lubricant means. The structure may be varied within equivalent limits without departure from the nature and principle of the invention.

What I claim and desire to secure by Letters Patent is:—

1. The combination with a shaft, of a lubricating bearing therefor, comprising a lubricant reservoir, a bushing surrounding the shaft and having a lubricant receiving opening in its upper portion and a lubricant discharge opening in its lower portion, and means for conducting the lubricant from the discharge opening to the receiving opening without returning it to the reservoir.

2. The combination with a shaft, of a lubricating bearing therefor, comprising a lubricant reservoir, a bushing surrounding the shaft and having a lubricant receiving opening in its upper portion and a lubricant discharge opening in its lower portion, and means for conducting the lubricant from the reservoir to the receiving opening and for conducting the lubricant from the discharge opening to the receiving opening without returning it to the reservoir.

3. The combination with a shaft, of a lubricating bearing therefor, comprising a lubricant reservoir, a bushing surrounding the shaft and having a lubricant receiving opening in its upper portion and a lubricant discharge opening in its lower portion, and a wick arranged with a portion located in the lubricant receiving opening and a portion located below the lubricant discharge opening to conduct lubricant from the discharge opening to the receiving opening without returning it to the reservoir.

4. The combination with a shaft, of a lubricating bearing therefor, comprising a lubricant reservoir, a bushing surrounding the shaft and having a lubricant receiving opening in its upper portion and a lubricant discharge opening in its lower portion, and a wick arranged with a portion located in the lubricant receiving opening, a portion located below the lubricant discharge opening and a portion extending in the said reservoir, whereby lubricant will be conducted from the reservoir to the receiving opening and the lubricant coming from the discharge opening will be reconducted to the receiving opening without being returned to the reservoir.

5. The combination with a shaft, of a lubricating bearing therefor, comprising a lubricant reservoir, a bushing surrounding the shaft and having a lubricant receiving opening in its upper portion and a lubricant discharge opening in its lower portion, and a length of wicking arranged with its intermediate portion located in the lubricant receiving opening and its ends knotted below the lubricant discharge opening and then depending into the reservoir, whereby lubricant will be conducted from the reservoir to the receiving opening and the lubricant coming from the discharge opening will be caught by the knotted portion of the wick and reconducted to the receiving opening without being returned to the reservoir.

HERBERT I. FINCH.